UNITED STATES PATENT OFFICE.

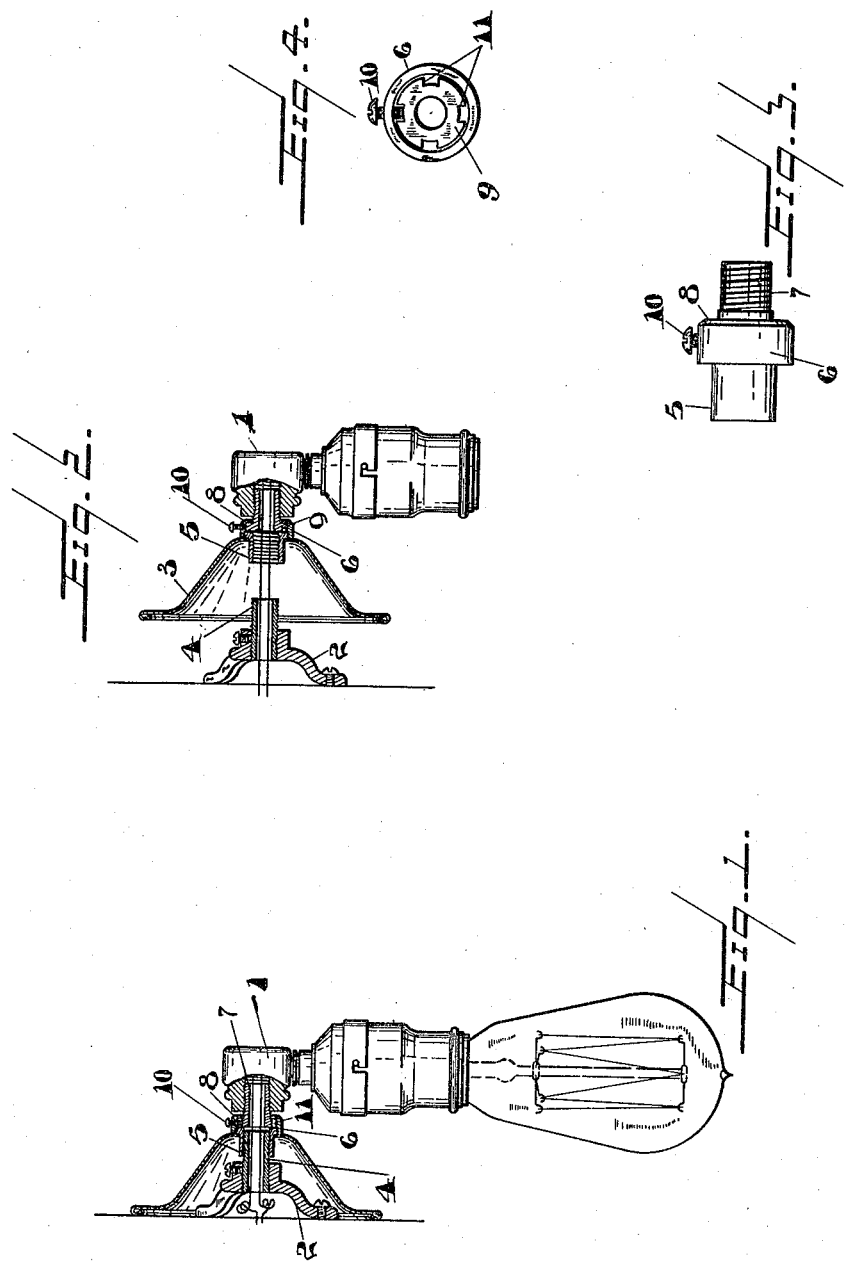

FRANK D. PARMENTER, OF TORONTO, ONTARIO, CANADA.

ATTACHING MEANS FOR ELECTRIC FIXTURES.

1,299,857.  Specification of Letters Patent.  Patented Apr. 8, 1919.

Application filed March 13, 1918. Serial No. 222,185.

*To all whom it may concern:*

Be it known that I, FRANK D. PARMENTER, of the city of Toronto, county of York, Province of Ontario, Canada, have invented certain new and useful Improvements in Attaching Means for Electric Fixtures, of which the following is a specification.

This invention relates to devices for securing electric fixture fittings to the outlet fittings used for wall and ceiling connections, and for holding the canopies in position, and my object is to devise efficient and secure connecting means which will permit of the canopies being easily withdrawn at any time to a sufficient distance from the wall or ceiling to permit of easy and satisfactory inspection of the work by an inspector, and which may be used with canopies of any size, type or form.

I attain my object by means of the constructions hereinafter described and illustrated in the accompanying drawings in which—

Figure 1 is a longitudinal section showing a fixture fitting and canopy secured in place;

Fig. 2 a similar view showing the device unscrewed and the canopy slipped back;

Fig. 3 a side elevation of the attaching means disconnected from the fixture fitting;

Fig. 4 an end elevation of the ring and head of the outer sleeve.

In the drawings like numerals of reference indicate corresponding parts in the different figures.

1 is a fixture fitting, 2 an outlet fitting shown as a crowfoot and 3 a canopy, all of the ordinary type. In using my attaching means the outlet fitting will be secured in place and leveled up in the ordinary manner. Into the outlet fitting is threaded a nipple 4, though the arrangement may vary in different fittings.

My special attaching means comprises the sleeve 5, a ring 6 and a sleeve 7. The sleeve 5 is threaded for connection with the nipple 4 and at its other end is permanently secured to the ring 6 preferably by being screwed into the ring and soldered. This ring is formed with an inwardly extending annular flange 8 and its rear face forms a canopy engaging shoulder. The sleeve 7 has a cylindrical head 9 formed thereon, which is received within the ring 6 and between the flange 8 and the end of the sleeve 5. When the sleeve 5 is secured to the ring 6, the sleeve 7 will be suitably held in position. The outer end of the sleeve 7 is threaded for connection with the fixture fitting 1 and a set screw 10 is screwed through the periphery of the ring 6 and is adapted to engage the head 9 of the sleeve 7. Preferably a series of equidistant notches or depressions 11 are formed in the periphery of the head 9. In the case of a ceiling or hanging fixture the set screw may be dispensed with.

The attachment is used as follows. The parts being all connected as shown in Fig. 3, the set screw 10 is loosened sufficiently to permit the ring to rotate freely relative to the sleeve 7. The ring 6 is then turned and the sleeve 5 screwed on to the nipple 4 until the canopy is tightly held between the surface to which the crowfoot is applied and the shoulder formed by the rear face of the ring 6. As the ring 6 and sleeve 5 are in effect integral, no change takes place in the distance between the adjacent face of the flange 8 when the ring is turned to screw the sleeve on to the crowfoot, consequently the head 9, which is preferably a snug fit in the cylindrical cavity in the ring, is just as free to turn after the ring 6 has been turned to screw on the sleeve 5 as it was before. The fixture fitting with the sleeve 7 is then turned until the set screw 10 is in alinement with one of the notches 11 and the fixture fitting closest to the desired position. The set screw is then screwed home and the fixture fitting if necessary is easily turned slightly to bring it into exactly proper position, the device as a whole turning on the outlet fitting.

When an inspector desires to inspect the wiring of the fixture, the set screw 10 is unscrewed sufficiently to free the head 9. The fixture fitting is then easily turned down out of the way and the ring turned to unscrew the sleeve 5 from the nipple 4. The canopy is then easily slipped back as far enough to properly inspect the wire, after which by going through the process hereinbefore described, the parts are brought back to their original positions.

This device possesses many advantages over the ordinary attachments, as the canopy, without any injury to the wires, can be withdrawn much farther from the wall or ceiling than with the ordinary constructions and the connections can be made or the parts disconnected without twisting or turning of the wires.

Further, it may be used with any type, size or form of canopy, either deep or shallow.

What I claim as my invention is:—

1. In attaching means for electric fixtures, the combination of a sleeve threaded for connection with an outlet fitting and having a rearwardly facing canopy engaging shoulder formed adjacent its outer end and within its outer end an annular groove forming a recess of fixed dimensions; and a sleeve adapted for connection with a fixture fitting having a head fitted within the recess aforesaid.

2. In attaching means for electric fixtures, the combination of a sleeve threaded for connection with an outlet fitting and having a rearwardly facing canopy engaging shoulder formed adjacent its outer end and within its outer end an annular groove forming a cylindrical recess of fixed dimensions; and a sleeve adapted for connection with a fixture fitting having a cylindrical head fitted within the cylindrical recess aforesaid; and a set screw threaded through the first mentioned sleeve adapted to engage the said cylindrical head.

Signed at Toronto, Canada, this 1st day of March, 1918.

FRANK D. PARMENTER.

Copies of this patent may be obtained for five cents each, by addressing the "Commissioner of Patents, Washington, D. C."